US012253361B2

(12) United States Patent
Lund

(10) Patent No.: US 12,253,361 B2
(45) Date of Patent: Mar. 18, 2025

(54) ALIGNMENT OF INDEPENDENT VISUAL NAVIGATION SYSTEMS AND METHODS

(71) Applicant: FLIR Unmanned Aerial Systems AS, Hvalstad (NO)

(72) Inventor: Jon Elvira Andres Lund, Hvalstad (NO)

(73) Assignee: FLIR Unmanned Aerial Systems AS, Hvalstad (NO)

( * ) Notice: Subject to any disclaimer, the term of this patent is extended or adjusted under 35 U.S.C. 154(b) by 144 days.

(21) Appl. No.: 17/868,318

(22) Filed: Jul. 19, 2022

(65) Prior Publication Data

US 2023/0035873 A1 Feb. 2, 2023

Related U.S. Application Data

(60) Provisional application No. 63/227,993, filed on Jul. 30, 2021.

(51) Int. Cl.
*G01C 21/00* (2006.01)
*G06V 20/17* (2022.01)
*G06V 20/58* (2022.01)

(52) U.S. Cl.
CPC .......... *G01C 21/005* (2013.01); *G06V 20/17* (2022.01); *G06V 20/58* (2022.01)

(58) Field of Classification Search
CPC .................................................. G07C 5/008
See application file for complete search history.

(56) References Cited

U.S. PATENT DOCUMENTS

| 7,739,034 | B2 | 6/2010 | Farwell |
| 9,068,847 | B2 | 6/2015 | Krishnaswamy et al. |
| 9,367,067 | B2 * | 6/2016 | Gilmore ................... G05D 1/12 |

(Continued)

FOREIGN PATENT DOCUMENTS

| WO | WO2014066996 | 5/2014 |
| WO | WO2018223104 | 12/2018 |

OTHER PUBLICATIONS

Cejay Engineering, Military Combat Identification, Helios™—UAV Beacon, Rev 2015 [URL:https://www.cejayengineering.com/military-combat-identification/helios-uav-beacon-detail].

(Continued)

*Primary Examiner* — Michael A Berns
(74) *Attorney, Agent, or Firm* — Haynes and Boone, LLP

(57) ABSTRACT

Systems and methods include tracking a current location of an unmanned device on a local map, receiving image data from an imaging sensor associated with the unmanned device, detecting a first remote device and outputting associated first detected object information, determining a first location of the detected first remote device on the local map, receiving first location information associated with a first remote coordinate system of the first remote device, the first location information corresponding to a location of the first remote device when the image data was captured, and determining a transformation between the local map and the first remote coordinate system. The local map may be aligned to a plurality of remote coordinate systems through triangulation based at least in part on location detections of a plurality of corresponding remote devices. The remote devices may generate a beacon or light that is detected by the system.

20 Claims, 9 Drawing Sheets

(56) References Cited

U.S. PATENT DOCUMENTS

| | | | | |
|---|---|---|---|---|
| 9,829,559 B2* | 11/2017 | Ganick | .................... | G01S 5/16 |
| 10,371,068 B2* | 8/2019 | McQuillen | .............. | F02D 37/02 |
| 11,521,273 B2* | 12/2022 | Jakka | .................... | G06N 20/00 |
| 2015/0205301 A1 | 7/2015 | Gilmore et al. | | |
| 2016/0139232 A1 | 5/2016 | Ganick et al. | | |
| 2022/0049960 A1* | 2/2022 | Xie | ....................... | G01S 5/0072 |
| 2022/0309767 A1* | 9/2022 | Keefe | .................... | G06T 7/277 |
| 2023/0035873 A1* | 2/2023 | Lund | ................... | G01C 21/005 |

OTHER PUBLICATIONS

Using Global Localization to Improve Navigation, Blog, Feb. 11, 2019, Posted by Tilman Reinhardt, Software Engineer, Google Maps [URL:https://ai.googleblog.com/2019/02/using-global-localization-to-improve.html].

* cited by examiner

ALIGNMENT OF INDEPENDENT VISUAL NAVIGATION SYSTEMS AND METHODS

CROSS REFERENCE TO RELATED APPLICATIONS

This application claims priority to and the benefit of U.S. Provisional Patent Application No. 63/227,993 filed Jul. 30, 2021 and entitled "ALIGNMENT OF INDEPENDENT VISUAL NAVIGATION SYSTEMS AND METHODS," which is incorporated herein by reference in its entirety.

TECHNICAL FIELD

One or more embodiments of the present disclosure relate generally to devices having visual navigation systems and more particularly, for example, to systems and methods for detecting, classifying and/or tracking objects in local and/or global coordinate systems.

BACKGROUND

Unmanned aerial vehicles (UAVs) commonly operate using a plurality of sensors, including one or more cameras, gyroscopes, accelerometers, global positioning satellite components, and other sensor systems. In some implementations, one or more of the sensor systems may be unable to track a location of the UAV through a particular environment. For example, in an environment where GPS is unavailable or lacks desired accuracy, the UAV may rely on visual localization and mapping.

One common approach is to capture images of various objects or features on the ground and track the location of those objects and/or features from frame to frame. Based on how these objects and/or features move in the image the UAV can calculate how the camera and UAV moved relative to the ground. Depending on the operating environment, the image may include visible light images, infrared images, and/or other image types. In some implementations, the UAV may be operating at night (or otherwise in the dark), in the fog or in other low visibility scenarios and be unable to reliably capture visible light images for use in navigation.

Although these types of algorithms may provide satisfactory positioning information within the UAV's own local frame of reference, tracking the same visual features using different UAVs may require that the visual features have a sufficiently similar visual appearance. For example, the visual appearance of a point in space can vary significantly based on many factors such as distance, resolution, viewing angle, illumination conditions, and more. Thus, if a system launches multiple UAVs from different places, it may be difficult to accurately determine if they have a visual line of sight to the same objects and/or features, because of large viewpoint differences to ground objects, particularly when the UAV is close to the ground. These differences make it difficult to accurately combine location data received from multiple UAVs.

In view of the foregoing, there is a continued need in the art for improved localization solutions, including systems and methods that collect data from a plurality of remote devices.

SUMMARY

Various systems and methods are provided for tracking the location of networked visual navigation devices, allowing for accurate transformations between local and global coordinate systems. In some embodiments, each of the visual navigation devices tracks its own motion with respect to a local frame of reference. For example, in some implementations, the visual navigation devices include unmanned vehicles (e.g., an unmanned aerial vehicle (UAV), unmanned ground vehicle (UGV), unmanned marine vehicle (UMV), etc.), and the systems and methods described herein are used to align the coordinate systems of two or more unmanned vehicles and/or align the coordinate system of an unmanned vehicle with a common reference coordinate system.

In some embodiments, the visual navigation devices are configured to traverse a search area and generate sensor data associated one or more objects that may be present in the search area. The visual navigation device is configured with a logic device configured to fuse the sensor inputs to detect, classify and localize objects, and may be configured to communicate object detection information to a control system. The vehicle navigation system is further configured to detect the location of other vehicle navigation devices in the area, which act as visual markers and/or beacons to align the coordinate systems of otherwise independent visual navigation systems.

The scope of the disclosure is defined by the claims, which are incorporated into this section by reference. A more complete understanding of the disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the disclosure and their advantages are best understood by referring to the detailed description that follows. It should be appreciated that like reference numerals are used to identify like elements illustrated in one or more of the figures.

DETAILED DESCRIPTION

Figure 1A:
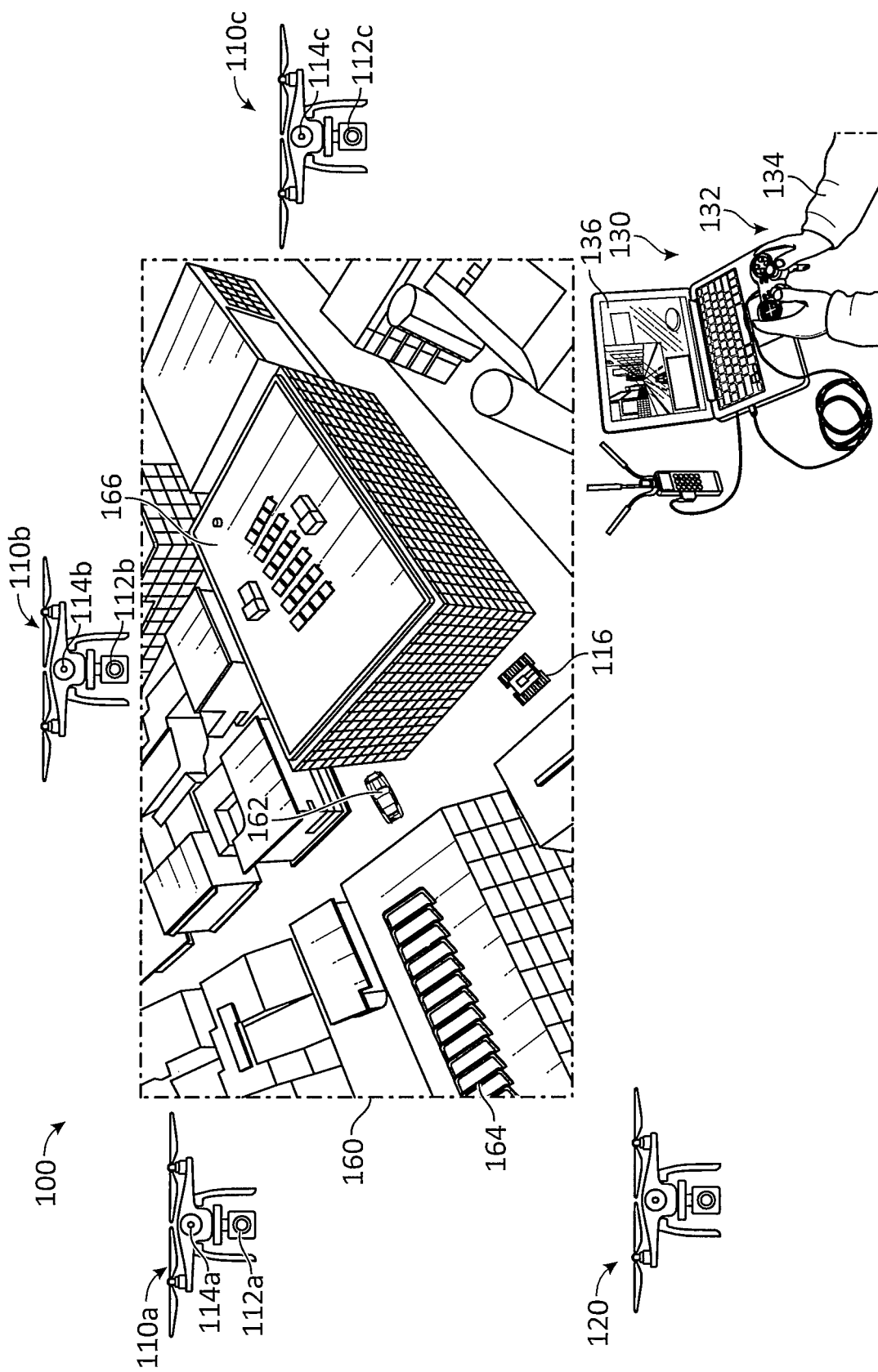
FIG. 1A illustrates an example system, in accordance with one or more embodiments.

Aspects of the present disclosure are directed to a plurality of networked visual navigation devices that are tracking their own location with respect to a local frame of reference, but whose relative alignment to other local frames (e.g., a local frame of reference of another device) may be unknown. The systems and methods described herein can be used to align those coordinate systems to each other and/or a common reference.

In some embodiments, the present disclosure estimates the relative positions and orientations of multiple UAVs. Each of the UAVs may already be running independent visual navigation systems, and it is desirable in many scenarios to align their coordinate systems to enable collaboratively solving a mission. For example, the UAVs may include object detection logic for detecting and determining the location of objects found in captured images. As the UAVs move around an area, the same object may be detected multiple times, by multiple UAVs. A goal of many systems is to identify each duplicate object detection and further identify when two of the same or similar objects are detected in close proximity. If the coordinate systems of the UAVs are not aligned, it may be more difficult to resolve object detections.

One approach is for each UAV to track its global position using GPS. However, GPS is not always available and, in some cases, may not be sufficiently accurate for the system (e.g., if the UAV is indoors, if the UAV is unable to lock onto the signal from three or four GPS satellites, etc.). In GPS-denied or limited environments, the UAV's can rely on visual localization and mapping. One approach is to extract salient visual features in the scene and track those features from frame to frame. Based on how these features move in the image the system (e.g., the UAV, a control station, a cloud server, etc.) can calculate how the camera moved relative to the world. In some embodiments, the location may be determined using Simultaneous Localization and Mapping (SLAM) or similar algorithms. These types of algorithms typically provide good positioning within each UAV's own local frame of reference, but to find the transformation between the distinct maps built on different UAV's more information may be required. In one approach, the UAVs could, for example, exchange the tracked objects/features over radio, and thus share a common map and track the same features.

One problem with the aforementioned approach is that tracking the same visual features may require that the visual features detected by the imaging sensors have a sufficiently similar visual appearance. The visual appearance of a point in space can vary significantly based on many factors such as distance, resolution, viewing angle, illumination conditions, and more. In addition, the different coordinate systems make it challenging to determine whether tracked objects are duplicate detections of the same object or should be tracked as different objects.

In accordance with various embodiments, if a system has launched multiple UAVs from different places and/or which have flown separate paths, they may not have seen any common visual references. This issue is aggravated when operating at low altitude or indoors), because of large viewpoint differences to close ground objects. Additionally, in some systems it may be desirable to relate the UAV's position to a ground operator's position. Doing this accurately would enable projection of objects visible from the UAV directly into the operator's field of view as an augmented reality overlay. This could for example enable the operator to track a moving target beyond its own line of sight, which may be addressed using the same approach as tracking multiple UAV's relative to each other as described herein.

In various embodiments, the deficiencies in conventional systems are addressed and/or mitigated by configuring the UAVs to identify and process other UAVs as visual references. This could be done, for example, by detecting the UAV directly in a captured image. However, at large distances and at night this may not be feasible. In such cases, each UAV may be further configured with a flashing light or beacon that may be detected by the camera of the other UAV(s). In some embodiments, the location of the UAVs relative to each other may be determined by triangulation, in which two or more visual beacon detections are used. The calculation of the relative position may include the common direction of gravity as a reference (e.g., using an accelerometer or other suitable sensor(s)). To remove uncertainty in the direction of gravity a third measurement could be used, and further measurements could also be used to reduce noise. In operation, the UAVs may be moving during image acquisition and detection of other UAVs as visual references. Thus, flashes detected by a UAV may come from different UAV's, or they may come from the same UAV that has moved to a new location.

In some embodiments, a similar approach is applied to finding the relative transformation between an operator's ground view (e.g., a ground view at an operator's control station, a ground view from a UGV, etc.) and a UAV's aerial view. With a visual line of sight between the operator's control station, for example, and the UAV, the system can find the relative transformation so that the UAV can project the objects observed in the aerial view into the operator's ground view as an augmented reality overlay.

In some embodiments, the system can use a chain of transformations between UAVs and other devices to find relative transformations between UAVs that are not in direct visual line of sight of each other. For example, a network of connected devices (e.g., UAVs and other networked devices) can be operated using the systems and methods disclosed herein to determine the relative transformations between the connected devices. In some embodiments, to add a new transformation associated with an additional device, such as a new UAV, the system triangulates the location with one or more devices already inside that network. Using this approach, a single line-of-sight triangulation could be sufficient to gain access to the relative transformations for the other beyond-line-of-sight devices.

Each triangulation introduces error. A long chain of short-distance triangulations will often be less accurate than fewer long-distance triangulations. Therefore, it is geometrically beneficial to have access to aerial beacons that can be seen at long range, as opposed to a purely ground-based system, where visual obstacles are more common. In some embodiments, triangulation only needs to happen once to align two coordinate systems. But since independent visual navigation systems will have some degree of drift relative to each other it may be beneficial to repeat the triangulation after a period of time.

In various embodiments, the UAVs are configured with visual beacons that emit light at wavelengths outside the visible spectrum to avoid light pollution in a civilian environment, or to avoid enemy detection in a military environment, for example. In these embodiments, the cameras used for triangulation are selected and/or configured for sensitivity to those emitted wavelengths. In some embodiments, the UAVs may use directionally focused light sources to avoid sending light in unwanted directions.

In various embodiments, the UAVs are configured to communications with other UAVs to share identification, location and/or other information. For example, a synchronization signal may be sent by a UVA over encrypted radio to verify the identity of the beacon and accurately predict when and where to look for a flash. Radio communications may also be used to transmit the information about location of the beacon in its own local coordinate system at the time of the flash. If no radio is available (for example if it is currently being jammed), the UAV can communicate by flashing a sequence where the time between flashes, duration of flashes or wavelength of the flashes can be varied to encode a message (e.g., similar to Morse code). The flashing system could thus act as a general-purpose backup-messaging system in cases where radio is unavailable. Authentication and handshaking can then be performed using these flashes.

Most non-vision based relative positioning systems today use receivers with low directional sensitivity. Such systems include GPS, radio-based time-of-flight measurements, wireless (e.g., wi-fi/Bluetooth) signal strength mapping, or triangulation of acoustic or other signals. Some of these systems have the advantage of good signal penetration beyond line of sight. However, many suffer from ambiguities associated with multipath reflections as the signals can bounce around buildings. Also, some have the disadvantage of relying on static signals (such as wi-fi mapping) or signals whose motion must be known a priori (such as GPS).

What sets cameras apart from these other sensors, is that they are directionally sensitive, as one pixel typically only covers an angle of $1/1000$ radian or less (depending on resolution and field of view). Although cameras don't have positioning information beyond line of sight, they have an advantage of being difficult to jam or deny this type of signal. Because the system already has accurate navigation with respect to its own local coordinate system, they system may perform triangulation to re-align with other agents in the network on an intermittent basis. This gives the system a good combination of robustness, accuracy, and autonomy.

Example Systems

In some embodiments, sensor data may be captured using a multi-modal, multi-camera system, for example implemented on a mobile robot (e.g., unmanned ground vehicle (UGV), unmanned aerial vehicle (UAV), unmanned marine vehicle (UMV), etc.), navigation system, or other device. Data captured with a multi-modal, multi-camera system will likely result in objects being seen by multiple systems, multiple sensors within a system, and from multiple perspectives. One or more errors in the calibration of these sensors and their transforms could result in object detection errors, such as duplication of detection data. In some embodiments, a Kalman filter takes into account the position of previous object estimates, the quality of the estimate, and an object classification to filter the object detections to remove duplicates and other invalid detections. The Kalman filter may be implemented, for example, as an unscented Kalman filter to estimate object data from a series of sensor measurements to track object's pose and inference probability and merge duplicates with respect to the "base_footprint" frame.

In various aspects of the present disclosure, systems and methods are implemented to calculate object detection probabilities and perform Kalman filtering to track objects in three dimensions within a local map, a global map, and/or other reference coordinate system. The system may be implemented as any system or device configured to capture sensor data for object detection and localization. In some embodiments, a plurality of unmanned aerial vehicles with multi-modal multi-camera systems are used to explore an area and map detected object locations. The sensors may be configured to use a common map representation, whether local or global, and the object detections from one or more sensors can be looked up to determine if the object already exists in the map. If a new object is detected, it can be added to the map. If a previously detected object is detected, the new object information (e.g., object location, bounding box, object type, confidence) can be combined with the existing object information to refine the three-dimensional (3D) position, classification, or pose of the object.

In some embodiments, an object detection and localization solution includes a group of components designed to achieve object permanence within the map, while allowing for position updates due to map optimizations. A local object tracker component fuses inference detections across multiple inference models into a common frame ID. In various embodiments, the interference models may include Deep Neural Network (DNN) models, such as Convolutional Neural Network (CNN) models, or other machine learning/artificial intelligence models trained to generate object detection information from sensor data, including one or more of object location, object type, object pose, object bounding box, confidence score, and/or other relevant object information (e.g., information relevant to a particular task/scenario).

In various embodiments, any suitable neural network inference model may be used, such as a model that generates a detection vector including an object type, confidence score, and bounding box location. The system may use a Kalman filter or other suitable process to merge multiple locally tracked objects into a single tracked object, based on available information including object type sizes. In some embodiments, the system is configured to track one object in a single location. Use of the Kalman filter also allows the local object tracker to override the inference probabilities from one or more sensors with stronger detections from other sensors. For example, if one camera sees the edge of one object type, with 40% probability, and another camera sees the same object as a different object type, with 85% probability, in the same location, the local object tracker can filter to the more probable object type with an adjusted probability (e.g., less than 85% probability to take into account the detection of the other object type).

In various embodiments, the global object tracker receives the locally tracked objects from the local object tracker and tracks them in the global map frame. The global object tracker may also use a Kalman filter (e.g., unscented Kalman filter) or other suitable process to track object pose and inference probabilities. In some embodiments, the mapping algorithm is configured to periodically run optimizations and update the objects tracked in the global object tracker. It is observed that updating the object locations with map optimizations improves spatial accuracy in tested systems (e.g., otherwise, tracked objects may no longer be spatially accurate after certain map optimization processing).

In some embodiments, the global object tracker is configured to include a pose manager component that tracks the map keyframes. After a new object is identified, the global object tracker uses the pose manager component to get the current map position to translate the locally tracked object into the map frame. The global object tracker may also be configured to regularly update the known list of tracked objects with the pose manager and update the object's pose in the case that optimization has occurred. In some embodiments, the global object tracker pose updates, based on map optimizations, can be manually triggered.

In various embodiments, a human-in-the-loop solution facilitates operator review of the object detections, providing a check to identify false or inaccurate object detections. For example, a system implemented in an unmanned aerial vehicle may operate in full autonomous exploration mode where it detects, classifies, and localizes objects as described herein (e.g., using a local object tracker, Kalman filter, global object tracker, etc.), and provide a representation of the detected object on an operator terminal for review by the operator to identify false detections.

Embodiments include systems where data describing objects detected by a sensor system are automatically detected, localized, and mapped, and may include a human-in-the-loop feature to send object information to a user to approve and/or update various parameters, such as detected type, position, color, and/or other parameters. The system may be configured to record and play back data that was captured by the sensor system during the detection of the object, providing the control station user a view of what led up to the detection of the object and the ability to supplement or correct the object information (e.g., object classification, object position, etc.). The user interface may include a real-time virtual reality, augmented reality or other three-dimensional interface of the 3D map and other telemetry data from the UAV to make it provide the user with additional views to make it easier for the user to approve/refine the collected sensor data.

In various embodiments, a remote device captures sensor data from an environment and performs object detection, classification, localization and/or other processing on the captured sensor data. For example, a system may include an unmanned aerial vehicle (UAV) configured to sense, classify, and locate objects in its environment, while in wireless communication with a control station that facilitates additional processing and control.

In some embodiments, the system is configured to capture the visible images of the object, but also position and location information from one or more sensors, such as point cloud data from a light detection and ranging (Lidar) system, real-world coordinate information from a global positioning satellite (GPS) system, and/or other data from other sensor systems, that applies to the scenario. In some embodiments, the system is configured to capture visible images of other UAVs to more refine the UAV's location information and transform the local coordinate system to one or more other coordinate systems.

The object detection systems and methods described herein may be used in various object detection contexts. For example, the system may include a robot (e.g., a UGV) that senses aspects of an environment, detects objects in the sensed data, and stores related object data in a database and/or local/global map of those object detections. The data may be directed to a control station where a user may approve and/or augment those detections before forwarding to the database.

In some embodiments, the detection of objects is performed using a trained artificial intelligence system, such as a deep neural network (DNN) or convolutional neural network (CNN) classifier that outputs a location of a box around detected objects in a captured image. In some cases, further detail may be desired, such as an understanding of the location of a reference point on the detected object. The systems described herein may be configured to create an augmentation to the data created by the artificial intelligence system, providing the user with an interface to verify or correct a particular point of interest and then transform the data into the correct reference frame. The present disclosure may be used with an artificial intelligence, machine learning, neural network or similar system that identifies an object type and/or class and the object position. In various embodiments, the classifier also outputs a probability indicating a confidence factor in the classification. The system is adaptable to a variety of machine learning frameworks, even systems that produce a large amount of error in the classification, provided the system produces a reasonable starting point for local/global object tracking framework and/or the user to make the correction.

Figure 1B:
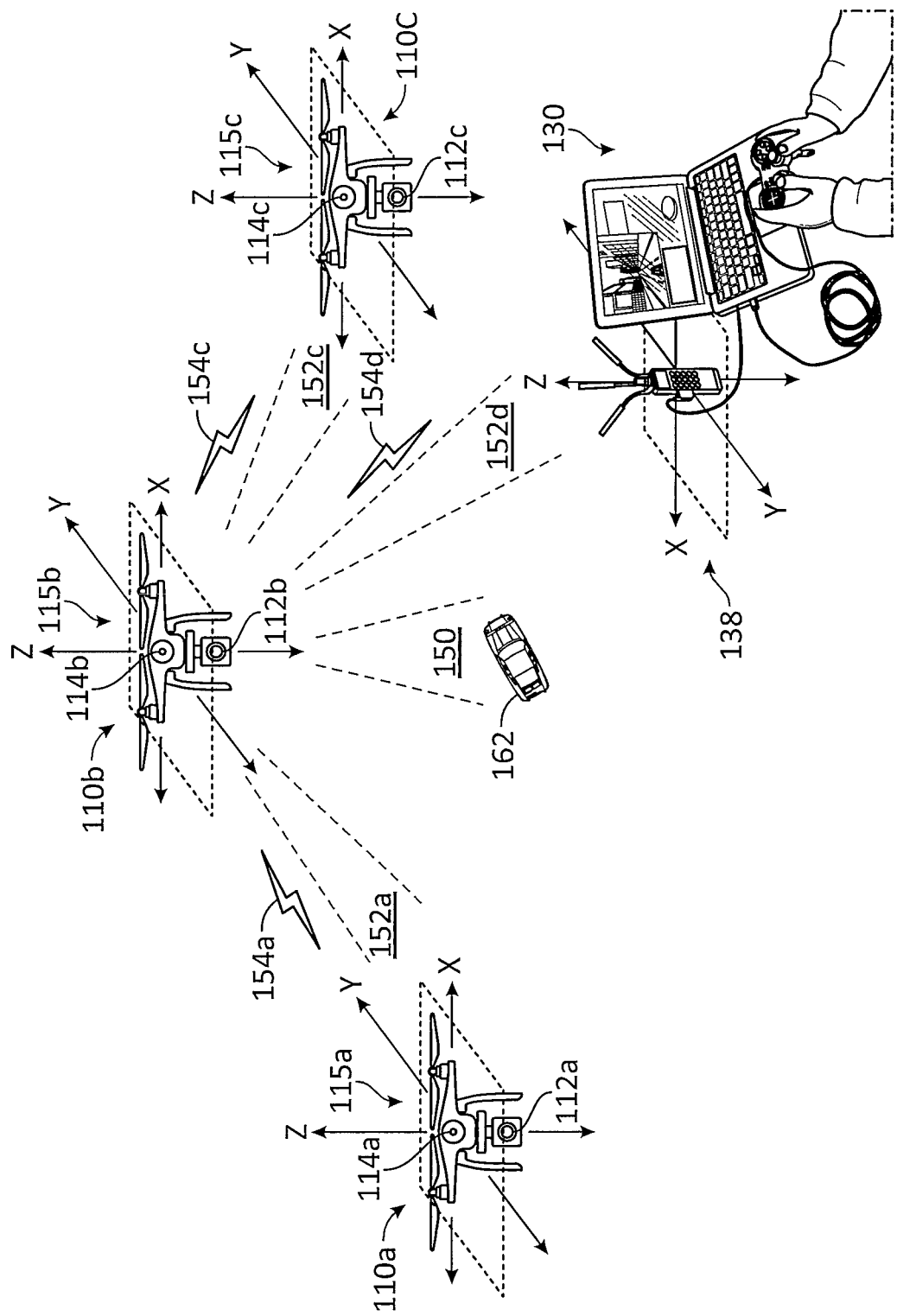
FIG. 1B illustrates an example alignment of local coordinate systems, in accordance with one or more embodiments.

Referring to FIGS. 1A and 1B, an example object detection and coordinate alignment system 100 will now be described, in accordance with one or more embodiments. In the illustrated embodiment, a plurality of robots 110*a-c* with imaging sensors 112*a-c* are controlled by one or more controllers 130 with user interface 132 and an interactive display 136 that commands the robots 110 to navigate through a real-world location 160. While the robots 110 are exploring, data about the location 160 is collected through the imaging sensors 112. In some embodiments, the robots 110 are configured to detect an object of interest (e.g., automobile 162) and place that object in a local map that the robot 110 is generating and storing in memory. The robot 110 may continue searching for and detecting objects of interest, such as building 164 and building 166 and/or other objects of various sizes and determining the location of the detected objects based on the robot's local coordinate system.

The controller 130 is configured to communicate with the robots 110*a-c* to access the image and/or detection data, which may include the updated local map including the new objects that have been detected and associate data such as their positions, type, and confidence level (e.g., of the classification) as determined by the robot. In some embodiments, a real-time virtual reality (VR) or augmented reality (AR) view of the 3D map and other telemetry from the robot 110 is provided to the operator 134 allowing the operator 134 to view the object and location.

In various embodiments, the location of a robot is determined based on GPS data, visualization of known objects, and/or other localization techniques. Each robot 110 is configured to track its own location with respect to its local frame of reference (e.g., local coordinate systems 115*a-c*) and further determine its relative alignment with the local frames of reference of other robots or known devices (e.g., controller 130). The robots 110*a-c* and/or controller 130 are configured to align their coordinate systems to each other and/or a common reference (e.g., the common reference of the controller 130, GPS coordinates, etc.).

In operation, each of the robots 110 is configured with its own visual navigation system to assist in traversing the location 160. The robots 110 may be configured with object detection logic for detecting and determining the location of objects found in captured images of the location 160. As the robots traverse the area and capture images, the same object may be detected multiple times, by multiple robots. The system 100 is configured to align the coordinate systems 115*a-c* of the robots 110 to enable collaboration among the robots 110*a-c*, such as in identifying, classifying, and localizing a detected object, building a map of the location 160, and/or achieving other goals.

In some embodiments, the robots 110*a-c* are configured to use GPS data when available, visual localization and mapping, and other techniques for determinizing tracking their locations. One approach is to capture images of the location 160 and identify and track visual features from frame to frame. Based on how these features move in the captured image, the robot can determine how the camera moved relative to the location 160. In some embodiments, the location may be determined using Simultaneous Localization and Mapping (SLAM) or similar algorithms. These types of algorithms typically provide good positioning within each robot's own local frame of reference.

To find the transformation between each robot's distinct map, the robots 110a-c may be configured to identify and process other UAVs in the captured images as visual references. In some embodiments, the imaging systems 112a-c are configured to capture visible images that include potential robots. The robots are also configured to communicate their own location information to other robots for use in aligning local coordinate systems.

In some embodiments, each robot 110a-c is configured with a light or beacon that may be detected by the image capture components of the other robots to help the robots identify each other, particularly at night or in areas with low visibility. In some embodiments, the robots 110a-c are configured to visually identify one or more other robots 110a-c, for example by capturing an image of a robot and detecting the robot in the image or by detecting a light or beacon in a captured image. The relative position of the detected robots may be estimated by triangulation, in which two or more visual detections are used. The calculation of the relative position may include the common direction of gravity as a reference (e.g., using a two-axis accelerometer or other suitable sensor(s)). To mitigate uncertainty in the direction of gravity a third measurement could be used, and further measurements could also be used to reduce noise. In operation, the robots may be moving during image acquisition and detection of other robots as visual references. In one approach, the robots, for example, exchange the tracked objects/features over radio, and thus share a common map and track the same features.

For example, robot 110b, may capture images of objects on the ground, such as automobile 162 in field of view 150, and determine a location of the object in its local coordinate system 115b. Other robots, such as robot 110a and robot 110c are also configured to gather data and determine locations on a local map in accordance with local coordinate systems 115a and 115c, respectively. To align its local coordinate system 115b, with the coordinate systems 115a and 115c, the robot is configured to capture images of one or more robots in visible range. The local imaging system 112b captures images in a field of view, such as field of view 152a which includes robot 110a, field of view 152c, which includes robot 110c, and/or field of view 152d, which includes the control station 130. In various embodiments, the imaging system 112b and/or robot 110b are configured to position the field of view in a desired direction, such as by moving and/or rotating the robot 110b, and/or moving and/or rotating the imaging system 112b (e.g., by mounting the imaging system 112b on one or more rotatable axes controllable through logic components of the robot 112b).

The captured images are analyzed by image analysis components of the robot 110b (e.g., an object detection system) to detect and localize a robot based on the local coordinate system 115b. In various embodiments, the robot may be detected and localized based on a visible image of the robot, a capture light and/or beacon emitted from a robot, visible indicia located on the robot, or other suitable methods as appropriate. Based on the orientation and position of the robot 110b and imaging system 112b, the size and location of the identified robot, and other available information (e.g., GPS data when available), the robot 110b determines the location of the identified robot in the local coordinate system 115b. In some embodiments, the robots include visible identifiers allowing the robot 110b to identify and differentiate between the other robots.

In some embodiments, the robots are configured to communicate with each other through radio frequency communications components and/or other wireless communications components. The communications may be performed directly between two robots, through the controller 130, through a network of robots, and/or through other communications systems. For example, the robot 110b may capture an image of robot 110a which is visible through field of view 152a. The robot 110b may also establish a wireless communications link 154a for sharing data with robot 110a. In some embodiments, the robot 110a transmits identification information (e.g., type of robot, identification of robot, beacon timing information, etc.), a timestamp and its location in the local coordinate map 115a. In some embodiments, the robot 110b is configured to synchronize a captured image with the timestamp and location data transmitted by the other robot to provide the robot 110b with location data in its local coordinate system 115b and the local coordinate system 115a of the other robot 110a. The robot 115b may use a similar approach to determine the relative position of the other robots such as robot 110c, which is in the field of view 152c and communicates through wireless communications link 154c, control station 130 which is in the field of field 152d and communicates through wireless communications link 154bd, and other robots and/or devices.

The local coordinate systems may be aligned by triangulation, in which two or more visual detections are used. The calculation of the relative position of a robot may include the common direction of gravity as a reference (e.g., using an accelerometer or other suitable sensor(s) to align a z-axis). To mitigate uncertainty in the direction of gravity a third measurement could also be used, and further measurements could also be used to reduce error in the measurements. In operation, the robots may be moving during image acquisition and detection of other robots as visual references. In one approach, the robots, for example, exchange the tracked objects/features over radio, and thus share a common map and track the same features.

In some embodiments, the robots 110a-c are configured to relate their positions to the control station's coordinate system 138. Doing this accurately enables projection of objects visible from the robots directly into the operator's field of view as an augmented reality overlay. This could for example enable the operator to track a moving target beyond its own line of sight, which may be addressed using the same approach as tracking multiple robots relative to each other as described herein. In some embodiments, a similar approach is applied to finding the relative transformation between a ground view (e.g., a ground view at an operator's control station 160 at coordinate system 138, a ground view from a UGV 116, etc.) and a robot's 110a-c aerial view. With a visual line of sight between the operator's control station 130, for example, and a robot 100, the system can find the relative transformation between coordinate systems so that the robot can project the objects observed in the aerial view into the operator's ground view as an augmented reality overlay. It is recognized that any suitable system or method for transforming between two coordinate systems may be used, including rotating and/or shifting the origin of one or more of the coordinate systems.

In some embodiments, the system can use a chain of transformations between the robots 100 (and/or other devices) to find relative transformations between UAVs that are not in direct visual line of sight of each other. For example, a network of connected devices (e.g., UAVs and other networked devices) can be operated using the systems and methods disclosed herein to determine the relative transformations between the connected devices. In some embodiments, to add a new transformation associated with an additional device, such as a new UAV 120, the system triangulates the location with one or more devices already inside the network of robots 110a-c. Using this approach, a single line-of-sight triangulation between UAV 120 and robot 110a, for example, could be sufficient to gain access to the relative transformations to all the other beyond-line-of-sight devices, such as robots 110b and 110c.

Each triangulation introduces error, so a long chain of short-distance triangulations may be less accurate than fewer long-distance triangulations. Therefore, it is geometrically beneficial to have access to aerial beacons that can be seen at long range, as opposed to a purely ground-based system where visible obstacle, such as buildings, are more common. A single triangulation can be used to align two coordinate systems. But since independent visual navigation systems will have some degree of drift relative to each other it may be beneficial to repeat the triangulation over time.

In various embodiments, the UAVs are configured with beacons 112a-c that emit light at wavelengths outside the visible spectrum to avoid light pollution in a civilian environment, or to avoid enemy detection in a military environment, for example. In this embodiment, the imaging systems 112a-c used for triangulation are selected and/or configured to be sensitive at those wavelengths. In some embodiments, the UAVs may use directionally focused light sources to avoid sending off light in unwanted directions.

In various embodiments, communications with other UAVs may include a synchronization signal may be sent by a UVA over encrypted radio to verify the identity of the beacon and accurately predict when and where to look for a flash. Radio communications may also be used to transmit the information about location of the beacon in its own local coordinate system at the time of the flash. If no radio is available (for example if it is currently being jammed), the UAV can communicate by flashing the beacon in a sequence where the time between flashes, duration of flashes or wavelength of the flashes can be varied to encode a message (e.g., similar to Morse code). The flashing system could thus act as a general-purpose backup-messaging system in cases where radio is unavailable. Authentication and handshaking can then be performed using these flashes.

The systems and methods disclosed herein provide numerous advantages. Non-vision based relative positioning systems today use receivers with low directional sensitivity. Such systems include GPS, radio-based time-of-flight measurements, wi-fi/Bluetooth signal strength mapping, or triangulation of acoustic or other signals. Some of these systems have the advantage of good signal penetration beyond line of sight. However, many suffer from ambiguities associated with multipath reflections as the signals can bounce around buildings. Also, some have the disadvantage of relying on static signals (such as wi-fi mapping) or signals whose motion must be known a priori (such as GPS).

The systems and methods disclosed herein are directionally sensitive, as one pixel in a captured image typically only covers an angle of $1/1000$ radian or less (depending on resolution and field of view). Although cameras don't have positioning information beyond line of sight, these systems have the advantage that it difficult to jam or deny this type of signal. And since these systems already provide accurate navigation with respect to its own local coordinate system, the system may perform triangulation calculations intermittently to re-align with other devices in the network. This gives us a very good combination of robustness, accuracy, and autonomy.

Figure 2:
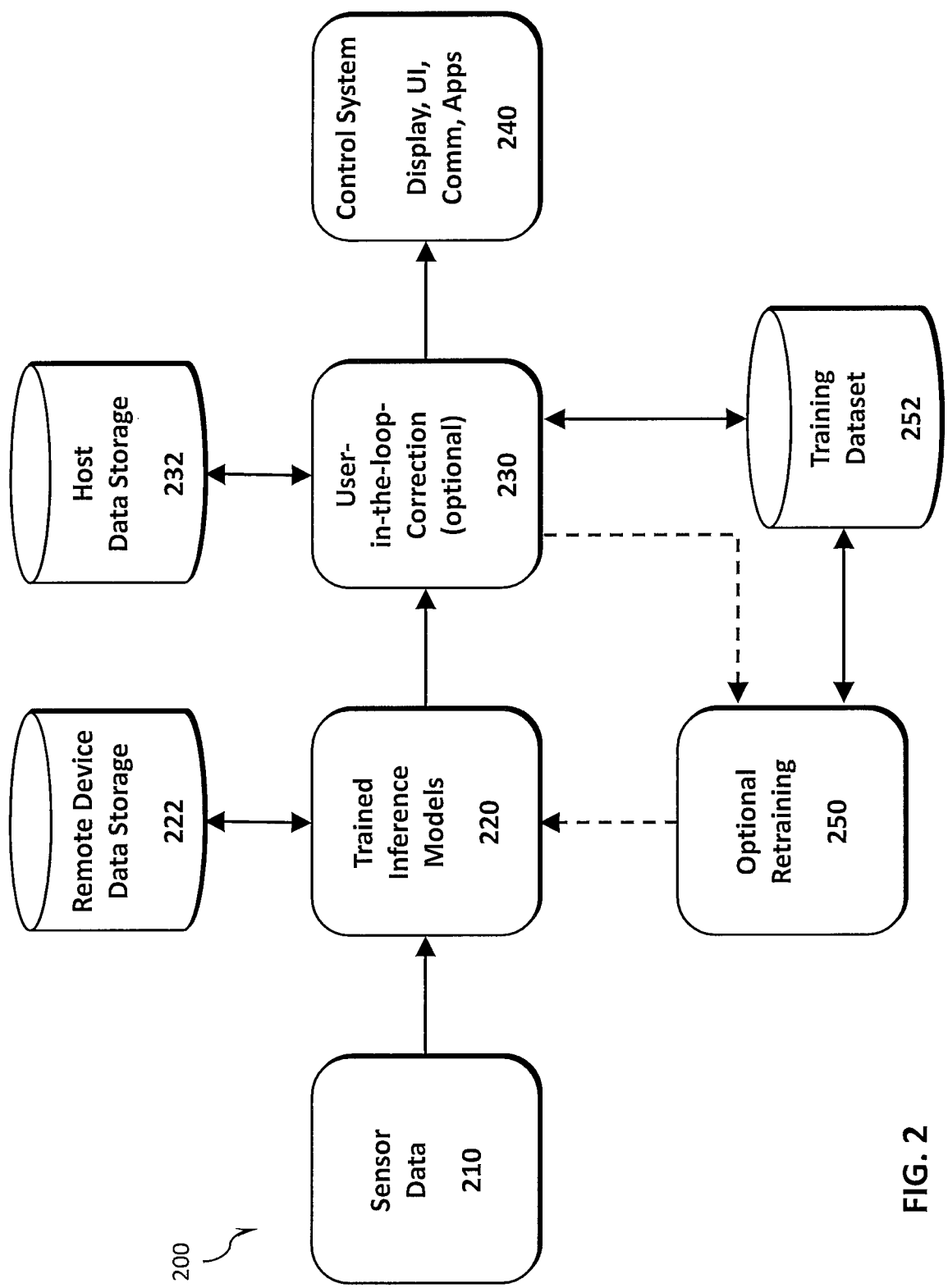
FIG. 2 illustrates an example operation of the system of FIG. 1A, in accordance with one or more embodiments.

An example operation of an object detection system will now be described in further detail with reference to FIG. 2, which illustrates an example robot system in accordance with one or more embodiments. A process 200 receives sensor data 210 from one or more sensor systems of a remote device, such as a UGV, an unmanned aerial vehicle (UAV), unmanned marine vehicle, or other remote device that includes an imaging sensor and/or other sensors for acquiring environmental data, and a processing component for detecting objects in the sensor data. The remote device processing components include a trained inference model 220 configured to receive sensor data and output detected objects, object locations, object classifications, and/or a classification confidence factor. In some embodiments, the trained inference model 220 includes a convolutional neural network trained on a training dataset 252 to detect, classify and locate objects in the sensor data. The trained inference model 220 may further include sensor data processing components for one or more of the sensors such as image processing algorithms, radar data processing algorithms, Lidar processing algorithms, and/or other sensor data processing algorithms.

The remote device is configured to store object data, map data and/or user-in-the-loop data in a remote device data storage 222. This data may include an identification of object detections and data acquired or produced during the period without communications, additional data collection such as pictures and video of the scene preceding, during and after detection, and other data.

An optional user-in-the-loop-correction process 230 can access and the data stored on the remote device data storage 222, including identifying for the user objects that were detected and classified and providing an interface allowing the user to walk through the detection and make corrections to the classification, location of the object, a point of interest on the object, and/or other collected data. The user interface may include a VR/AR interface allowing the user to explore the captured data and map to aid in the user corrections. The user interface may include a display and control over video of the detection, including forward, reverse, pause, zoom, and other video controls as known in the art. The user interface may also display the local map constructed by the remote device and/or global map constructed by the system. The controller stores the data in a host data storage 232, which may include one or more of a local storage device, a networked storage device, a cloud storage device, or other suitable storage device or system.

After corrections are made by the user the corrected object classification information may be formatted for use in the training dataset 252. In an optional retraining process 250, the control system is configured to retrain the inference model 220 using the updated training dataset 252 and replace the trained inference model 220 if certain criteria are met. In one embodiment, the performance of the updated artificial intelligence training model is tested using a test dataset, and the results are compared against the performance of the current trained inference model 220 using the same dataset. The system may be configured, for example, to replace the trained inference model 220 if the performance of the updated model is above a certain threshold factor compared to the existing model. In the illustrated embodiment, the user accesses the system using a control system 240, that includes a display, user interface, communications components, data processing applications, and user applications.

Figure 3:
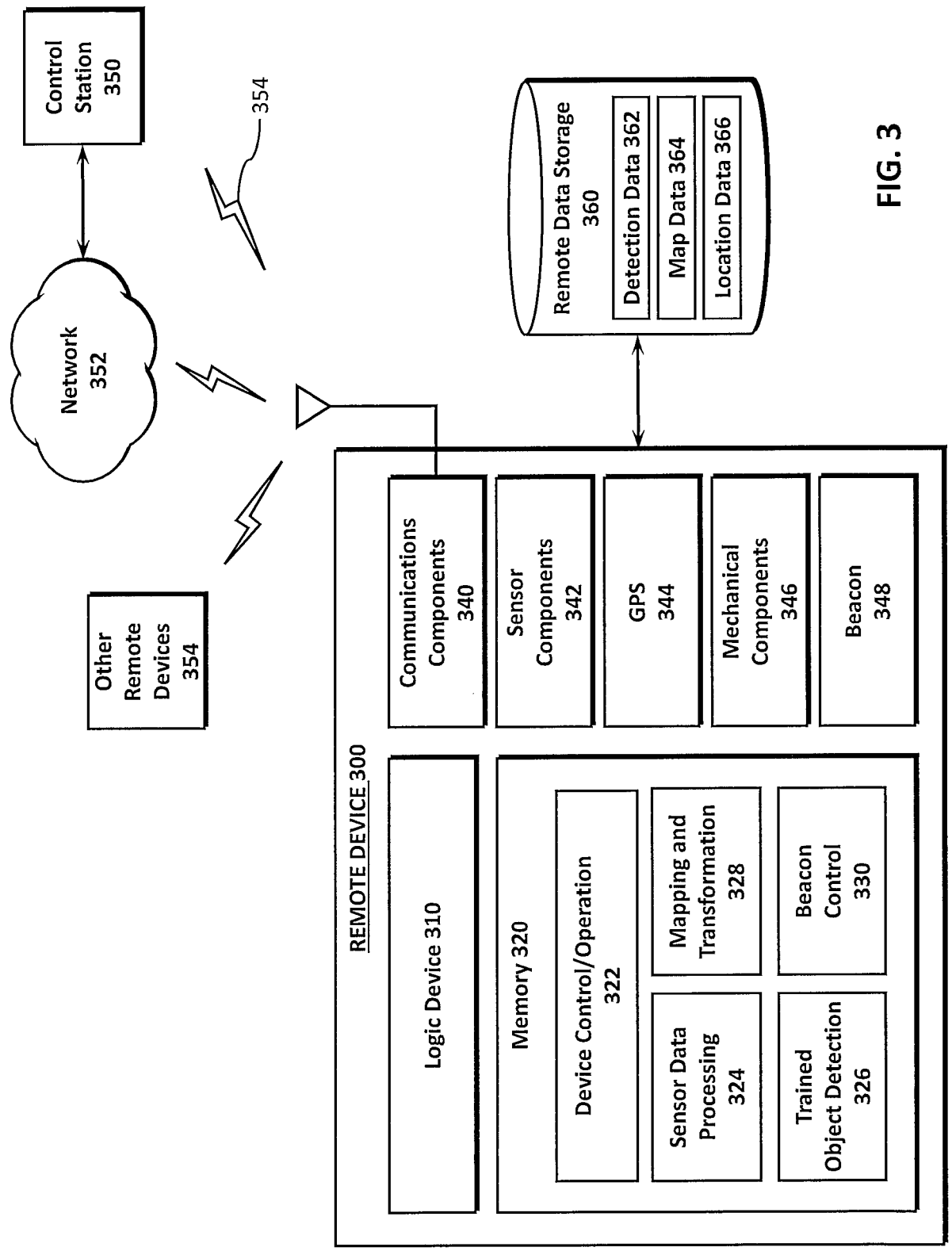
FIG. 3 illustrates an example remote device configured to process image data, in accordance with one or more embodiments.

An example embodiment of a remote device will now be described with reference to FIG. 3. In some embodiments, a remote device 300 is configured to communicate with a control station 350 over a wireless connection 354 or other suitable communications link. As illustrated, the remote device 300 may include an unmanned vehicle, such as a UGV, UAV or UMV or other device configured to travel and collect environmental data. In various configurations, the user may control, interact and/or observe the activity of the remote device 300 through a control station 350 in real-time and/or at a later time to review and correct object detections.

The remote device 300 is generally configured to capture and analyze sensor data to detect and classify objects. The remote device 300 includes a logic device 310, a memory 320, communications components 340, sensor components 342, GPS components 344, mechanical components 346, and a beacon 348.

The logic device 310 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), a graphics processing unit and/or any other appropriate combination of processing device and/or memory configured to execute instructions to perform any of the various operations described herein. Logic device 310 is adapted to interface and communicate with components 320, 340, 342, 344, 346, 348, and 360 to perform method and processing steps as described herein.

It should be appreciated that processing operations and/or instructions may be integrated in software and/or hardware as part of logic device 310, or code (e.g., software or configuration data) which may be stored in memory 320. Embodiments of processing operations and/or instructions disclosed herein may be stored by a machine-readable medium in a non-transitory manner (e.g., a memory, a hard drive, a compact disk, a digital video disk, or a flash memory) to be executed by a computer (e.g., logic or processor-based system) to perform various methods disclosed herein.

Memory 320 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory.

In various embodiments, the logic device 310 is adapted to execute software stored in memory 320 and/or a machine-readable medium to perform various methods, processes, and operations in a manner as described herein. The software includes device control and operation instructions 322 configured to control the operation of the remote device, such as autonomous navigation, data acquisition, communications, and control of various mechanical components 346 of the remote device 300. The software further includes sensor data processing logic 324 configured to receive captured data from one or more sensor components 342 and process the received data for further use by the remote device 300. The software further includes trained object detection models 326 configured to receive processed sensor data and output object detection and classification information that may include object location and a confidence factor for the classification. In various embodiments, the trained object detection models 326 include one or more models for detecting, classifying, and localizing other remove devices 354 detected in one or more captured images, and may be configured to detect an image of a remote device, a light or beacon emitted from a remote device 354, and/or other visible indicia of the remote device for use in aligning local maps/coordinate systems.

The software further includes beacon detection logic 330 configured to synchronize operation of the beacon 348 (or other light emitting component) to emit a visible light or other signal for detection by image processing logic another remote device 354 for use in aligning coordinate systems. In some embodiments, the beacon detection logic 330 is configured to communicate with other remote devices 354 through communication components 340 to share location information (e.g., from GPS and/or local map data) along with a timestamp corresponding to the beacon and/or other information. In various embodiments, the beacon 348 is any device that emits light and may include devices that emit light at wavelengths outside the visible spectrum, and the sensor components 342 and trained object detection models 326 are configured to capture, detect, classify, and localize images of the emitted light for use in triangulation as described herein. In some embodiments, the beacon 348 may be implemented as a directionally focused light source (e.g., a laser, light emitting diode, etc.) to avoid sending off light in unwanted directions.

In various embodiments, the light source is actively driven to emit a light signal for use in aligning independent coordinate systems. For example, the light signal may include a known transmission wavelength, a particular duration or emission interval, emission timing, and/or other light signal characteristics. In some embodiments, the light signal uniquely identifies an associated remote device controlling the emission, and the software of each remote device is configured to detect the light signal in the captured images/video and identify the associated remote device.

In various embodiments, the beacon control logic 330 communications with other remote devices and may include a synchronization signal sent over wireless radio communications to verify the identity of the beacon 348 and allow the other remove devices 354 to accurately predict when and where to look for an emitted light signal. Radio communications may also be used to transmit the information about the location of the beacon in its own local coordinate system at the time of the flash. The beacon control logic 330 may optionally be configured to communicate by flashing the beacon in a sequence where the time between flashes, duration of flashes or wavelength of the flashes can be varied to encode a message (e.g., similar to Morse code). The flashing system could thus act as a general-purpose backup-messaging system in cases where radio is unavailable.

The memory 320 also stores software instructions for execution by the logic device 310 for mapping the environment, which may include user-in-loop data acquisition. The mapping system 328 is configured to use the sensor data, object detection and classification information, GPS data from GPS 344, and other available information to construct a map of the sensed environment as the remote device 300 traverses the area. In some embodiments, the mapping system 328 includes a local object tracker, a Kalman filtering module, and other suitable logic. The user-in-loop data acquisition logic may be configured to detect whether the remote device 300 has lost communications with the control station 350 and store additional data, such as video captured before, during and after object detection, other sensor data relevant to object classification, GPS location data, and other information to aid the user of the control station 350 in visually confirming and/or correcting object detection and classification information. The memory 320 and/or remote storage device is further configured to store object detection data 362, map data 364 and location data 366.

The sensor components 342 include an imaging sensor and/or one or more other sensors configured to sense and capture information about the surrounding environment. The sensor components 342 include one or more image sensors for capturing visible spectrum and/or infrared spectrum images of a scene as digital data. Infrared sensors may include a plurality of infrared sensors (e.g., infrared detectors) implemented in an array or other fashion on a substrate. For example, in one embodiment, infrared sensors may be implemented as a focal plane array (FPA). Infrared sensors may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. Infrared sensors may be implemented, for example, as microbolometers or other types of thermal imaging infrared sensors arranged in any desired array pattern to provide a plurality of pixels.

The sensor components 342 may further include other sensors capable of sensing characteristics of one or more objects in the environment, such as a radar system, a Lidar system, or other sensor system. Radar and/or Lidar systems are configured to emit a series of pulses or other signals into the scene and detect pulses/signals that are reflected back off of objects in the scene. The components produce signal data representing objects in the scene and corresponding sensor data processing logic 324 is configured to analyze the signal data to identify the location of objects within the scene. Logic device 310 may be adapted to receive captured sensor data from one or more sensors, process captured signals, store sensor data in memory 320, and/or retrieve stored image signals from memory 320.

The communications components 340 include circuitry and components (e.g., an antenna) for communicating with other devices using one or more communications protocols (e.g., a wireless communications protocol). The communication components 340 may be implemented as a network interface component adapted for communication with a network 352, which may include a single network or a combination of multiple networks, and may include a wired or wireless network, including a wireless local area network, a wide area network, a cellular network, the Internet, a cloud network service, and/or other appropriate types of communication networks. The communications components 340 are also configured, in some embodiments, for direct wireless communications with the control station 350 using one or more wireless communications protocols such as radio control, Bluetooth, Wi-Fi, Micro Air Vehicle Link (MAVLink), and other wireless communications protocols.

GPS 344 may be implemented as a global positioning satellite receiver, a global navigation satellite system (GNSS) receiver, and/or other device capable of determining an absolute and/or relative position of the remote device 300 based on wireless signals received from space-born and/or terrestrial sources, for example, and capable of providing such measurements as sensor signals. In some embodiments, GPS 344 may be adapted to determine and/or estimate a velocity of remote device 300 (e.g., using a time series of position measurements).

The mechanical components 346 include motors, gears, wheels/tires, tracks, and other components for moving remote control across the terrain and/or operating physical components of the remote device 300. In various embodiments, one or more of the mechanical components 346 are configured to operate in response to instructions from logic device 310. The remote device 300 may further include other components such as a housing that protects the various components of remote device 300 from environmental or other conditions as desired.

Figure 4:
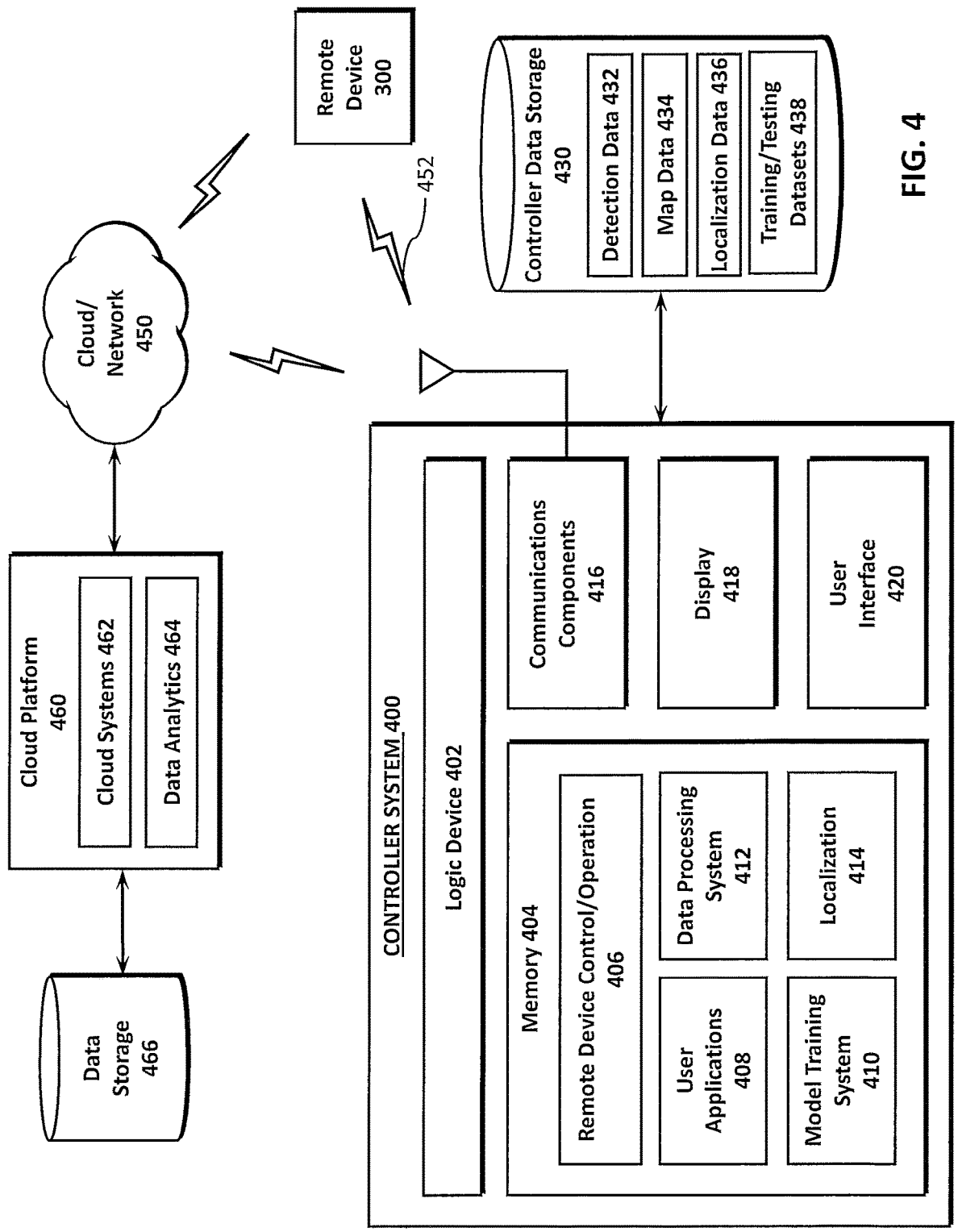
FIG. 4 illustrates an example control station, in accordance with one or more embodiments.

An example controller system for use with remote device 300 will now be described with reference to FIG. 4. A controller system 400 is configured to communicate with remote device 300 across a wireless communications link 452, and/or through a network, such as cloud/network 450, to interface with the remote device 300. In the illustrated embodiment, the controller system 400 includes a logic device 402, a memory 404, communications components 416, display 418 and user interface 420.

The logic device 402 may be include, for example, a microprocessor, a single-core processor, a multi-core processor, a microcontroller, a programmable logic device configured to perform processing operations, a DSP device, one or more memories for storing executable instructions (e.g., software, firmware, or other instructions), a graphics processing unit and/or any other appropriate combination of processing device and/or memory configured to execute instructions to perform any of the various operations described herein. Logic device 402 is adapted to interface and communicate with various components of the controller system including the memory 404, communications components 416, display 418 and user interface 420.

Communications components 416 may include wired and wireless interfaces. Wired interfaces may include communications links with the remote device 300, and may be implemented as one or more physical network or device connect interfaces. Wireless interfaces may be implemented as one or more WiFi, Bluetooth, cellular, infrared, radio, MAVLink, and/or other types of network interfaces for wireless communications. The communications components 416 may include an antenna for wireless communications with the remote device during operation.

Display 418 may include an image display device (e.g., a liquid crystal display (LCD)) or various other types of generally known video displays or monitors. User interface 420 may include, in various embodiments, a user input and/or interface device, such as a keyboard, a control panel unit, a graphical user interface, or other user input/output. The display 418 may operate as both a user input device and a display device, such as, for example, a touch screen device adapted to receive input signals from a user touching different parts of the display screen.

The memory 404 stores program instructions for execution by the logic device 402 including remote device control/operation instructions 406, user applications 408, model training system 410, data processing system 412, and localization logic 414. Data used by the controller system 400 may be stored in the memory 404 and/or stored in a separate controller data storage 430. The remote device control and operation instructions 406 facilitate operation of the controller system 400 and interface with the remote device 300, including sending and receiving data such as receiving and displaying a real-time video feed from an image sensor of the remote device 300, transmitting control instructions to the remote device, and other operations desired for a particular implementation. The user applications 408 include system configuration applications, data access and display applications, remote device mission planning applications, and other desired user applications. The localization logic 414 is configured to process and reconcile map data 434, including calculating and storing transformations between local coordinate systems of remote devices 300. In some embodiments, the localization logic 414 may be configured to provide line-of-sight alignment between the controller system 400 and one or more remote devices 300, as described herein, and store related information as localization data 436.

The model training system 410 generates trained inference models for implementation on the remote device 300 and the controller system 400. In some embodiments, one or more aspects of the model training system 410 may be implemented through a remote processing system, such as a cloud platform 460, that includes cloud systems 462, data analytics 464 modules, and data storage 466. In some embodiments, the cloud platform 460 is configured to perform one or more functions of the controller system 400 as described herein. The data processing system 412 is configured to perform processing of data captured by the remote device 300, including viewing, annotating, editing, and configuring map information generated by the remote device 300.

Optional user-in-the-loop applications may be configured to facilitate user review, confirmation, refinement, and correction of the object detection data, and improvement to the trained inference models. In some embodiments, the user-in-the-loop applications 414 include processes for accessing object detection data and user-in-the-loop data from the remote device 300 corresponding to periods without communication between the controller system 400 and the remote device 300 (and/or other periods as defined by the system, such as periods associated with object classifications that have a confidence factor below a threshold) and facilitating an interactive display providing the user with a visual representation of the object detection data. In some embodiments, the visual representation includes stored video from before, during, and after detection, display of other sensor data, and display of the object detection data. The user may control the display to focus on desired aspects of the object and/or object detection data and input confirmation on object classification, refinement of object classification data (e.g., manual adjusting object location, manually identifying a point of interest on the object, etc.) and corrections to object classification data. In some embodiments, the object detection and classification data (e.g., detection data 432) may be combined with map data 434 generated by the remote device 300 and/or provided from another source (e.g., through the cloud platform 460). The map data 434 may include detection object information, local map data, global map data and/or map data representing a different reference coordinate system as disclosed herein. In some embodiments, the display 418 and user interface 420 include a virtual reality headset or similar device allowing the user to interact with the data in a three-dimensional space.

In some embodiments, the user-in-the-loop applications 414 are further configured to generate labeled training data to the model training system 410 representing corrections and/or refinements to the object detection data generated by one or more trained inference models. In one implementation, user corrections and refinements are provided to the model training system 410 for consideration in adding to the training and/or testing datasets 438. The model training system 410 is configured to compare training results with and without the user corrections. If the accuracy of the inference model is determined to be improved by including of the new training data, then the new training data is added to the training dataset and the model training system 410 generates an updated inference model to replace the object detection model implemented by the remote device 300.

Figure 5A:
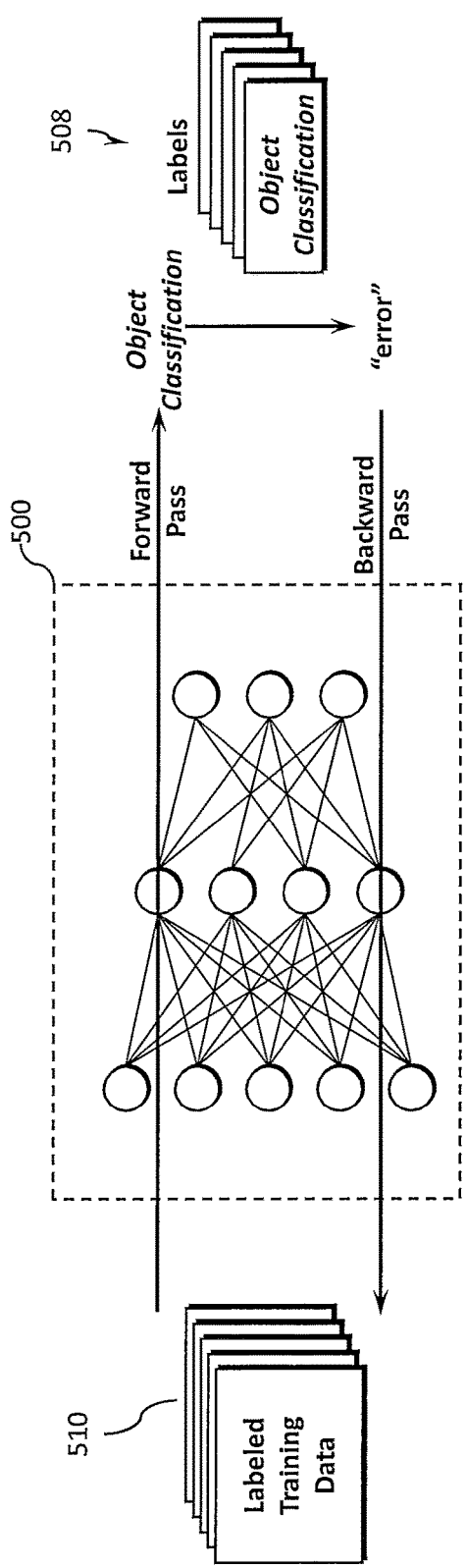
FIG. 5A illustrates an example neural network training process, in accordance with one or more embodiments.

Referring to FIG. 5A, an example a neural network that may be used to generate trained training models will be described, in accordance with one or more embodiments. The neural network 500 is implemented as a deep neural network, convolutional neural network or other suitable neural network that receives a labeled training dataset 510 to produce object detection information 508 for each data sample. The training dataset represents captured sensor data associate with one or more types of sensors, such as infrared images, visible light images, radar signal data, Lidar signal data, GPS data, and/or other data used by the remote device 300. For object classification in images, the images may comprise a region of interest from a captured image that includes an object to be identified. In some embodiments, the labeled training data 510 includes images of remote devices and/or beacons/lights for training the neural network 500 to detect, classify and localize remote devices for use in aligning coordinate systems, as described herein.

Figure 5B:
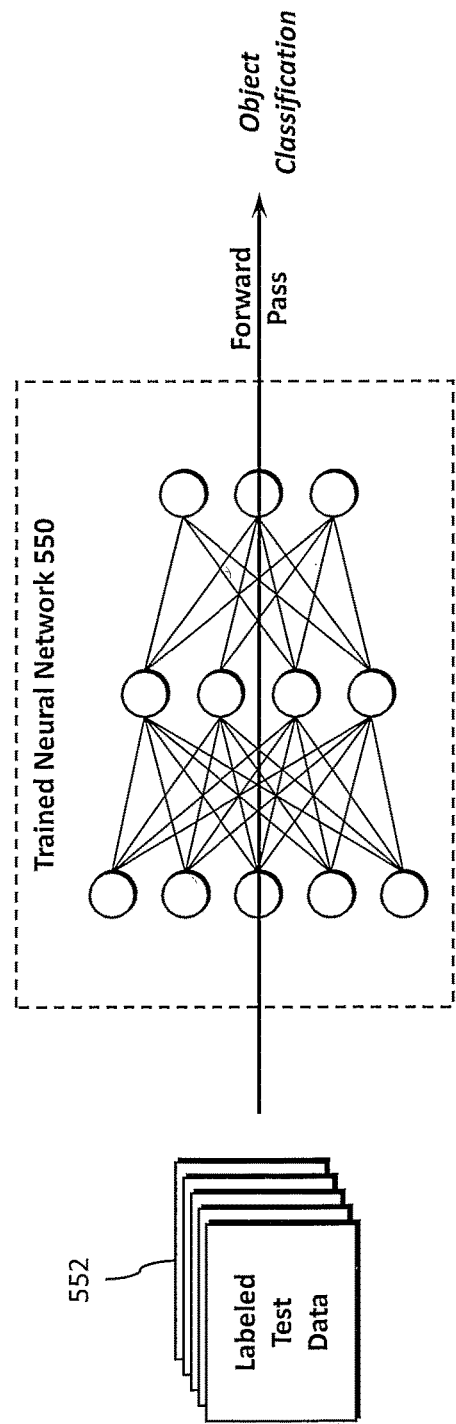
FIG. 5B illustrates a validation process for the neural network of FIG. 5A, in accordance with one or more embodiments.

The training includes a forward pass through the neural network 500 to produce object detection and classification information, such as an object location, an object classification, and a confidence factor in the object classification. Each data sample is labeled with the correct classification and the output of the neural network 500 is compared to the correct label. If the neural network 500 mislabels the input data, then a backward pass through the neural network 500 may be used to adjust the neural network to correct for the misclassification. Referring to FIG. 5B, a trained neural network 550, may then be tested for accuracy using a set of labeled test data 552. The trained neural network 550 may then be implemented in a run time environment of the remote device to detect and classify objects.

Figure 6:
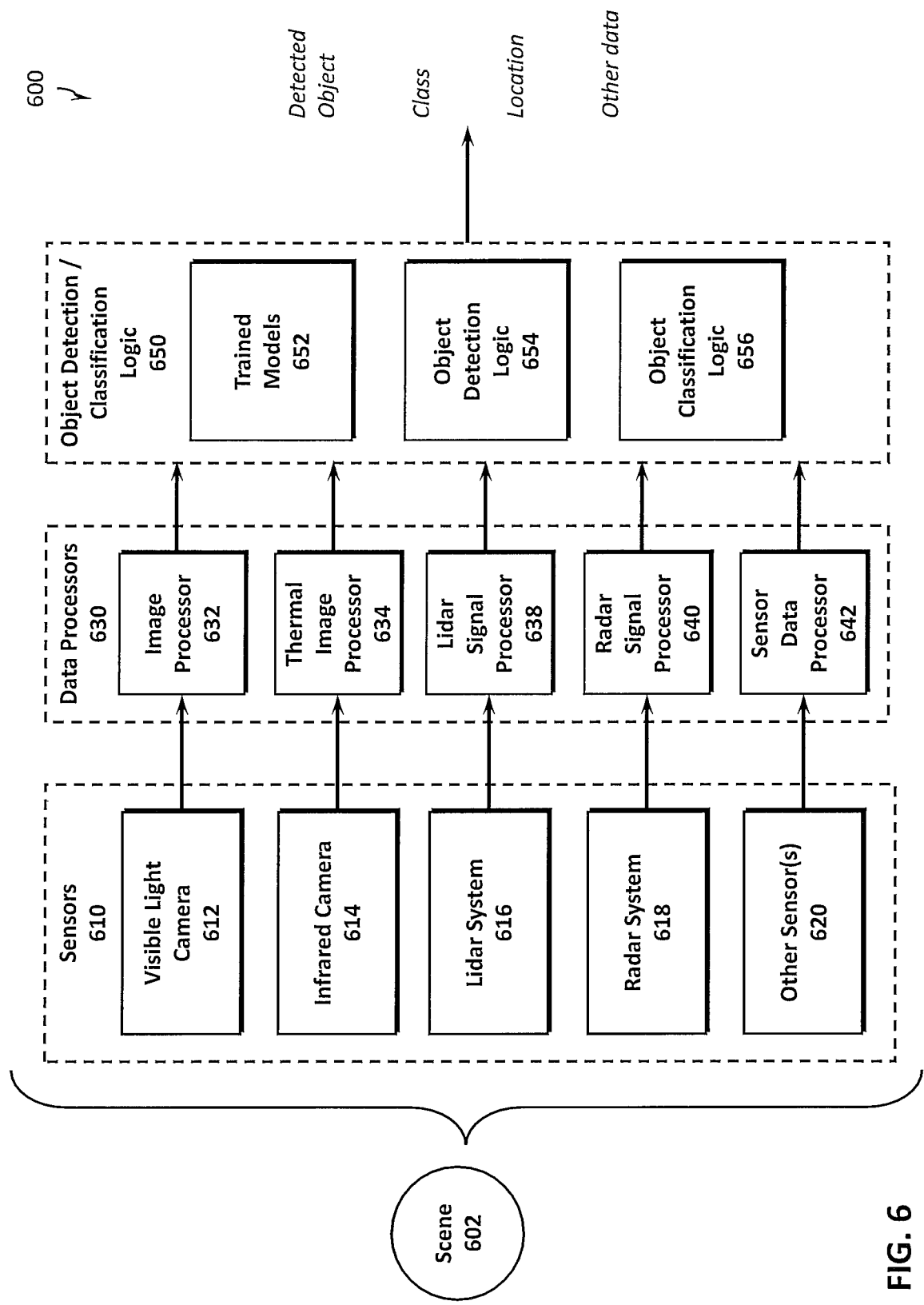
FIG. 6, illustrates an example sensor data processing system, in accordance with one or more embodiments.

Referring to FIG. 6, an example object detection system will now be described in accordance with one or more embodiments. The object detection system 600 may be implemented in a remote device or other system as described herein. The object detection system 600 includes a plurality of sensors 610 configured to sense objects in a scene 602, a plurality of data processors 630 configured to receive the sensor data and transform the raw data into form that is useable by the system 600, and object detection classification logic 650 configured to detect objects, classify objects, provide an associated confidence factor, determine an object location, and/or produce other desired object data.

The sensors 610 include at least one imaging sensor (e.g., a visible light or infrared camera) and may further include any other sensor or device that is capable of sensing environmental data related to the scene 602 and producing corresponding data that assists in generating desired object information used herein. In the illustrated embodiment, the sensors include a visible light camera 612, an infrared camera 614, a Lidar system 616, a radar system 618 and other sensors 620. Each of the sensors 610 produces raw data that is transformed using appropriate data processing components into a format that useable by the object classification system. In the illustrated embodiment, for example, the data processors 630 include an image processor 632, a thermal image processor 634, a Lidar signal processor 638, a radar signal processor 640, and a sensor data processor 642 which corresponds to another sensor type, as needed. In one or more embodiments, the data processors 630, may perform addition data manipulation, including feature extraction for input into the object detection and classification logic 650.

The object detection and classification logic 650 includes one or more trained models 652 and (optionally, as needed) object detection logic 654 and object classification logic 656 to perform additional object detection and classification operations that are more efficiently and/or more accurately performed outside of the trained models 652. For example, object detection for some sensor types may be performed using background learning algorithms, motion detection algorithms, and other suitable algorithms. In various embodiments, the data from individual sensors may be processed separately (e.g., through separate trained AI models) and/or data from two or more sensors be combined through a fusion processor to produce a single classification.

Figure 7:
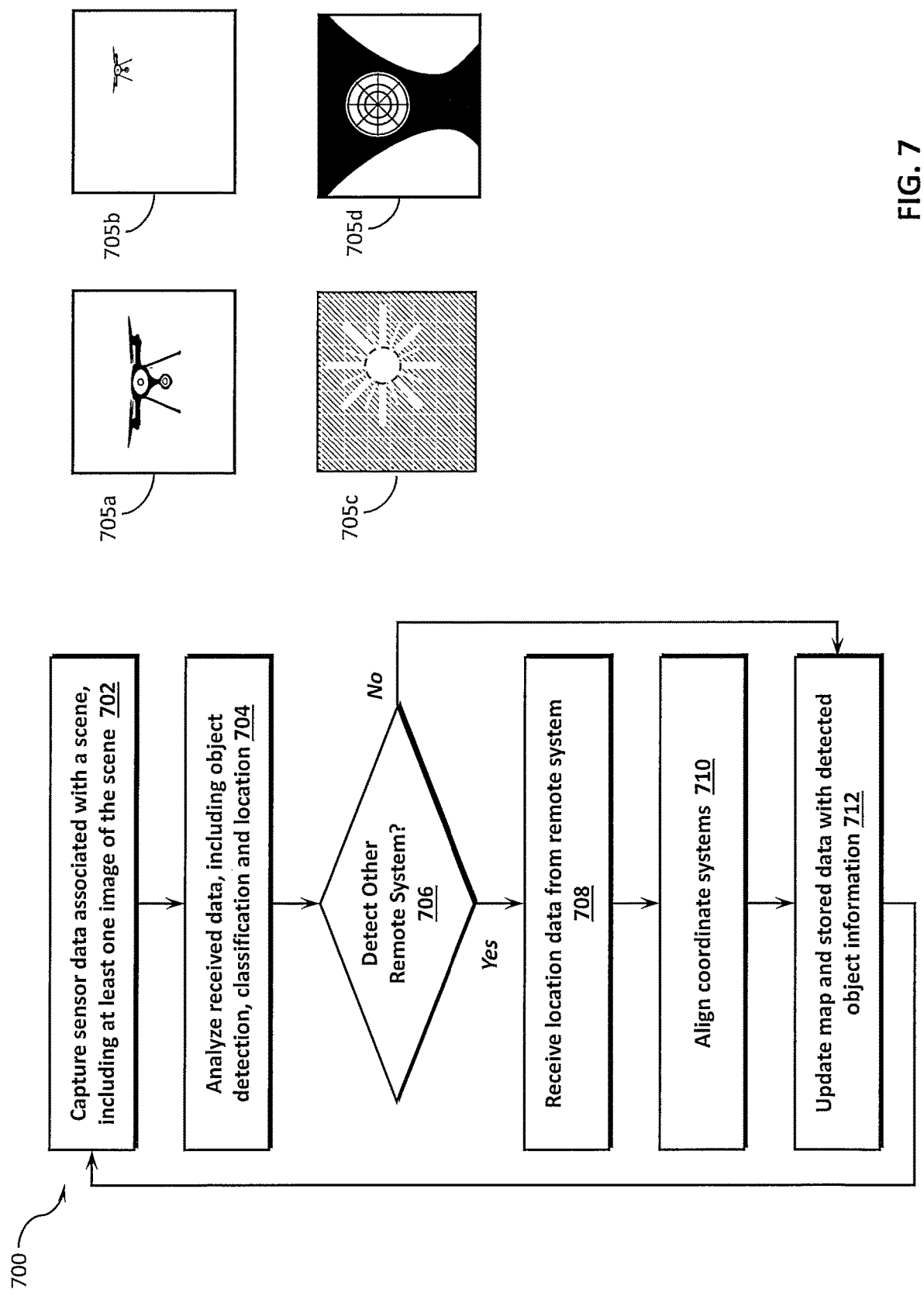
FIG. 7 illustrates an example operation of localization in a remote device, in accordance with one or more embodiments.

Referring to FIG. 7, an example operation of localization in a remote device will now be described, in accordance with one or more embodiments. An object detection and classification process 700 starts by capturing sensor data associated with a scene, in step 702. The data includes at least one image of all or part of the scene to facilitate object detection, classification, and localization. In various embodiments, the data may further include a timestamp for the captured data, an estimated position of the remote system in the local coordinate system, a direction and orientation of the imaging system with respect to the local coordinate system, and/or other data. In step 704, the system analyzes the received sensor data and performs object detection, classification, and localization. In various embodiments, an inference model is trained to detect a remote system from the captured images. For example, the inference model may detect a remote system in an image 705a or an image 705b and utilize known information about the remote system (size, shape, dimensions) and the imaging system to estimate a distance of the remote system from the imaging system. For example, the larger image of the remote device in image 705a indicates that the remote device is closer than the smaller remote device in image 705b. In some embodiments, the system is configured to detect a beacon emitted from a remote device, such as a beacon in 705c. In some embodiments, the system is synchronized with the remote system to detect beacon flashes at an expect time. In some embodiments, the system includes other indicia on the remote system that may be identified on the remote device, such as the marking on image 705d, for example. The size and location of the beacon flash, indicia and/or other feature in the captured image is used to identify the remote device, and its distance and location relative to the imaging system.

It is recognized that at short distances the pixels covered by an object of known size can be used to measure distance, but at large distances reliance on size may become noisy and unreliable. In various embodiments, the tracked light source is treated as a point-observation that can be triangulated though repeated observation from different viewpoints. This can be done, for example, with multiple (3 or more) devices or with two devices that move relative to each other. Other implementations may alternatively use time-of-flight methods to measure the distance, which is possible with electromagnetic or acoustic measurement of round-trip-delay, for example.

In various embodiments, the beacon is identified by the remote device through an image capture and analysis process. A sequence of captured images is analyzed to detect the presence and/or absence of a beacon. For example, an image capture device is configured to capture images in a field of view that may include one or more other remote devices. The remote devices actively transmit a light signal through a series of flashes that are identified in one or more image frames. In some embodiments, a sequence of captured images is analyzed to detect and track light sources over time, including detecting the timing sequence of the emitted light (e.g., sequence and duration of light emission and intervals between light emission). In various embodiments, a light source may be detected through image analysis (e.g., identifying areas of the image that match an intensity, wavelength/color of known light sources), by comparing differences in sequences of images to detect a light flash, through machine learning/artificial intelligence systems, and/or other suitable processes.

In various embodiments, the remote system is configured to track identified light sources in the captured images over time, and for each tracked image, determine the emitted signal characteristics (e.g., wavelength/duration/emission interval/emission timing) and compared against stored signal characteristics of known devices. In some embodiments, each light source generates a repeating pattern of generated light and intervals without light emission that may be captured and identified by another remote device. The location of the tracked light sources may be estimated using the pixel locations of the tracked light sources in the captured images. In some embodiments, triangulation of multiple location determinations over time may be used to estimate the location light emitting device, including location determination from a plurality of geographic locations of the image capturing remote device.

If the detected object is another remote system (step 706), then the system receives location data from the remote system corresponding to time of the image capture (step 708). In step 710, the system aligns the local coordinate system with the coordinate system of the remote device by generating a transform between the two coordinate systems. In some embodiments, the alignment is performed through triangulation after detecting location information from a plurality of remote devices. In some embodiments, each remote device is configured to emit a light signal and each remote device is configured to detect, track, and determine the location of identified light signals for more accurate alignment of the coordinate systems. In step 712, the system updates the map and stored object detection data to capture relevant data captured or detected by the remote device.

Object Tracking in Aligned Local and Global Maps

In various embodiments, the systems and methods disclosed herein use probabilities and Kalman filtering (e.g., unscented Kalman filtering) to track objects in three dimensions, within the local and global maps (or other reference coordinate system), with a device (e.g., unmanned ground robot) including a multi-modal, multi-camera system. With a multi-modal, multi-camera system objects will likely be seen by multiple cameras, from multiple perspectives, at the same time. Errors in the data (e.g., due to one or more errors in the calibration of those sensors and their transforms) could result in duplication of detection data. To address these issues, systems and methods of the present disclosure take into account the position of the previous estimates, the quality of the estimate, and/or the type of object, when adding object data to a map.

Figure 8:
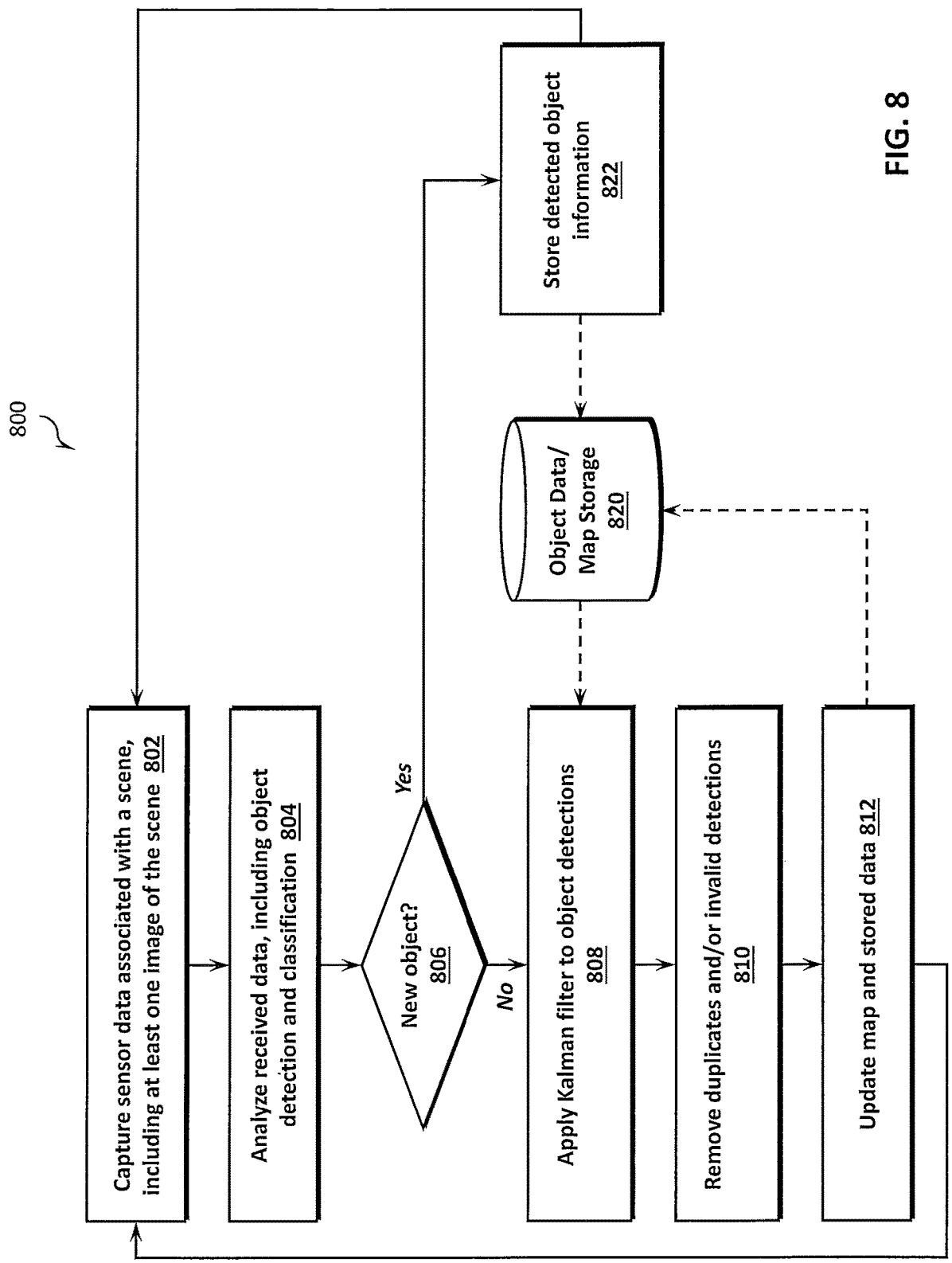
FIG. 8 illustrates an example operation of localization processing, in accordance with one or more embodiments.

Example embodiments of object tracking in a local and global map will now be described with reference to FIG. 8, which illustrates an example process 800 for object tracking within a local or global map, in accordance with one or more embodiments. The system may include, for example, an unmanned vehicle with a multi-modal, multi-camera system to capture sensor data from a scene, a manned vehicle or device, a mobile system, a system for processing data received from a multi-modal, multi-camera system, an operator terminal, and/or other processing systems. In step 802, the system captures sensor data associated with a scene, including at least one image of the scene. In various embodiments, the system captures frames of sensor data at a rate of multiple frames per second (e.g., 15 fps).

In step 804, the system analyzes received sensor data and performs object detection, classification, and/or localization of detected objects in three-dimensional space. In various embodiments, each sensor of the system is part of a transformation tree that is relative to a root node (e.g., relative to the orientation of the device). In various embodiments, the fusion and analysis of sensor data is performed by a local object tracker component, which includes one or more neural networks configured for object detection, classification, confidence determinations, depth, location, and/or other suitable object information.

Because the group of cameras (and other sensors) use a common map representation, both local and global, the detections from each camera can be searched to determine if they already exist in the map, within some 3D positional threshold (step 806). If the detected objects don't exist, they can be added to an object storage (step 808), but if they do, the quality of the estimate can be combined with the existing probability estimate and refine the 3D position or pose of the object. The stored detection object information may include, for example, object classification, confidence, bounding box, location, etc.

With a multi-modal, multi-camera system (e.g., on a mobile robot), objects will likely be seen by multiple cameras and/or sensors, from multiple perspectives, at the same time, and error(s) in the calibration of those sensors and their transforms could result in duplication of detection data and/or differences in object classification and localization information. In step 808, the system applies a Kalman filter process to take into account previous object detection estimates (e.g., object data from previous frames and/or map storage 820), the quality of the estimates, the type of object detected, and/or other available information. In step 810, the system removes duplicates and/or invalid detections and synthesizes the data into updated object information. In step 812, the system stores the updated object data in the map storage 820. Referring back to step 806, if the detected object is new (e.g., the location of the object is not within a proximity threshold of a previously detected object), then the new object information added in step 822 to the object data and map storage 820.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
   tracking a current location of an unmanned device on a local map;
   receiving image data from an imaging sensor associated with the unmanned device;
   detecting a first remote device in the image data and outputting associated first detected object information;
   determining a first location of the detected first remote device on the local map from the first detected object information; and
   determining, from the determined first location, a transformation between the local map and a first remote coordinate system of the first remote device.

2. The method of claim 1, further comprising:
   receiving data from a plurality of sensors associated with the unmanned device comprising visible light image data, infrared image data, global position satellite data, radar data and/or Lidar data;
   wherein the detecting a first remote device and outputting associated first detected object information is based at least in part on the data received from the plurality of sensors.

3. The method of claim 2, further comprising tracking, using a local object tracker, detected objects in the local map by fusing object detections from a plurality of object detection inference models to identify locally tracked objects.

4. The method of claim 1, where detecting a first remote device and outputting associated first detected object information further comprises providing the image data to an object detection inference model configured to detect, classify, and localize the first remote device.

5. The method of claim 1, further comprising:
   tracking, using a local object tracker, detected objects in the local map based on the object information; and
   tracking, using a global object tracker, detected objects on a global map.

6. The method of claim 1, wherein the unmanned device comprises an unmanned aerial vehicle, an unmanned ground vehicle, and/or an unmanned marine vehicle.

7. The method of claim 1, further comprising:
   receiving first location information associated with the first remote coordinate system of the first remote device, the first location information corresponding to a location of the first remote device when the image data was captured; and
   detecting a second remote device and outputting associated second detected object information;
   determining a second location of the detected second remote device on the local map;
   receiving second location information associated with a second remote coordinate system of the second remote device, the second location information corresponding to a location of the second remote device when the image data was captured; and
   aligning the local map with the first remote coordinate system and the second remote coordinate system through triangulation based at least in part on the first location information and the second location information.

8. The method of claim 1, wherein detecting a first remote device and outputting associated first detected object information further comprises:
   detecting a size of an image of the first remote device from the image data;
   determining a distance to the first remote device based at least in part on the size of the image of the first remote device; and
   determining a location of the first remote device in the local map based at least in part on the determined distance and a position and orientation of the imaging sensor.

9. The method of claim 1, wherein detecting a first remote device and outputting associated first detected object information further comprises:
   detecting a light signal associated with the first remote device in the image data, wherein the light signal comprises a series of light emissions and intervals between light emissions generated for use by other remote devices to track the location of the first remote device;
   determining a distance to the first remote device based at least in part on a plurality of locations measurements associated with the detected light signal in the image data; and
   determining a location of the first remote device in the local map based at least in part on the determined distance and a position and orientation of the imaging sensor.

10. The method of claim 9, further comprising:
    receiving beacon timing information from the first remote device; and
    capturing an image during a beacon flash generated by the first remote device;
    wherein detecting a light associated with the first remote device in the captured image comprises detecting the beacon flash that satisfies the timing information.

11. The method of claim 10, wherein information received from the first remote device comprises data received over a wireless radio transmission and/or data received via communication comprising beacon flashes.

12. The method of claim 1, further comprising performing Kalman filtering across a plurality of frames of detection data including resolving duplicates and/or invalid object detections.

13. An apparatus comprising:
    location components configured to track a current location of the apparatus on a local map;
    an imaging sensor configured to generate image data;
    an object detection component configured to detect a first remote device in the image data and output associated first detected object information;
    local map components configured to determine a first location of the detected first remote device on the local map from the first detected object information; and
    transformation components configured to determine, from the determined first location, a transformation between the local map and a first remote coordinate system of the first remote device.

14. The apparatus of claim 13, further comprising:
    a plurality of sensors comprising a visible light image sensor, an infrared image sensor, global position satellite components, a radar transceiver and/or a Lidar transceiver;
    a plurality of inference models configured to detect one or more objects from the plurality of sensors.

15. The apparatus of claim 14, further comprising a local object tracker configured to track detected objects in the local map by fusing object detections from a plurality of object detection inference models to identify locally tracked objects.

16. The apparatus of claim 13, wherein the apparatus is an unmanned device comprising an unmanned aerial vehicle, an unmanned ground vehicle, and/or an unmanned marine vehicle.

17. The apparatus of claim 13, further comprising communications components configured to receive first location information associated with a first remote coordinate system of the first remote device, the first location information corresponding to a location of the first remote device when the image data was captured;
    wherein the object detection component is configured to detect a second remote device and output associated second detected object information;
    wherein the local map components are further configured to determine a second location of the detected second remote device on the local map;
    wherein the communications components are further configured to receive second location information associated with a second remote coordinate system of the second remote device, the second location information corresponding to a location of the second remote device when the image data was captured; and
    wherein the transformation components are further configured to align the local map with the first remote coordinate system and the second remote coordinate system through triangulation based at least in part on the first location information and the second location information.

18. The apparatus of claim 13, wherein the object detection component is further configured to:
    detect a size of an image of the first remote device from the image data;
    determine a distance to the first remote device based at least in part on the size of the image of the first remote device; and
    determine a location of the first remote device in the local map based at least in part on the determined distance and a position and orientation of the imaging sensor.

19. The apparatus of claim 13, wherein the object detection component is further configured to:
    detect a light associated with the first remote device in the image data;
    determine a distance to the first remote device based at least in part on a location of the detected light in the image; and
    determine a location of the first remote device in the local map based at least in part on the determined distance and a position and orientation of the imaging sensor.

20. An apparatus comprising:
    location components configured to track a current location of the apparatus on a local map;
    an imaging sensor configured to generate image data;
    an object detection component configured to detect a first remote device in the image data and output associated first detected object information;

local map components configured to determine a first location of the detected first remote device on the local map;
communications components configured to receive first location information associated with a first remote coordinate system of the first remote device, the first location information corresponding to a location of the first remote device when the image data was captured; and
transformation components configured to determine a transformation between the local map and the first remote coordinate system;
wherein the object detection component is further configured to:
   detect a light associated with the first remote device in the image data;
   determine a distance to the first remote device based at least in part on a location of the detected light in the image; and
   determine a location of the first remote device in the local map based at least in part on the determined distance and a position and orientation of the imaging sensor;
wherein the communications components are further configured to:
   receive one or more beacon characteristics from the first remote device; and
   detect the one or more beacon characteristic in a captured image associated with the light generated by the first remote device;
wherein the object detection component is further configured to detect a light associated with the first remote device in the image by detecting the beacon flash that satisfies the timing information.

* * * * *